(12) United States Patent
Burgett et al.

(10) Patent No.: US 6,970,795 B1
(45) Date of Patent: Nov. 29, 2005

(54) METHOD AND APPARATUS FOR CALCULATING ALTITUDE BASED ON BAROMETRIC AND GPS MEASUREMENTS

(75) Inventors: Scott Burgett, Overland Park, KS (US); Jay Dee Krull, Olathe, KS (US)

(73) Assignee: Garmin Ltd., (KY)

( * ) Notice: Subject to any disclaimer, the term of this patent is extended or adjusted under 35 U.S.C. 154(b) by 0 days.

(21) Appl. No.: 10/803,722

(22) Filed: Mar. 18, 2004

Related U.S. Application Data (63) Continuation of application No. 09/891,002, filed on Jun. 25, 2001, now Pat. No. 6,735,542.

(60) Provisional application No. 60/289,722, filed on May 9, 2001.

(51) Int. Cl.$^7$ ............................................ G01D 18/00
(52) U.S. Cl. .................... 702/85; 342/357.06
(58) Field of Search ........................... 702/85, 194, 30, 702/184; 701/213, 4, 207, 301; 342/120, 342/357.06, 462, 357.02; 700/44, 277, 243; 340/970, 540, 905; 244/3.25

(56) References Cited

U.S. PATENT DOCUMENTS 6,768,449 B1 * 7/2004 Burgett et al. ......... 342/357.06

* cited by examiner

*Primary Examiner*—Michael Ngheim
*Assistant Examiner*—Xiuqin Sun
(74) *Attorney, Agent, or Firm*—Devon A. Rolf (57) ABSTRACT

A navigation device and a method of calibrating the same are provided. The device includes a barometric pressure sensor and a GPS receiver. A processor calculates barometric and GPS derived altitudes and, based on a difference therebetween, corrects barometer altitude readings that would otherwise include drift errors. The processor uses a filter, such as a state feedback loop, to determine correction factors. The state feedback loop is adjustable to operate with different time constants. An error drift model is empirically determined and used to set the time constant. The time constant may be adjusted during operation based on a relation between the barometer correction quantity and an uncertainty in the vertical component of the GPS derived altitude. The method includes updating and recalibrating an atmospheric pressure model used to derive altitudes from the output of the barometric pressure sensor.

4 Claims, 5 Drawing Sheets

METHOD AND APPARATUS FOR CALCULATING ALTITUDE BASED ON BAROMETRIC AND GPS MEASUREMENTS

CROSS REFERENCE TO RELATED APPLICATIONS

This application is a continuation of application Ser. No. 09/891,002, filed Jun. 25, 2001, now U.S. Pat. No. 6,735,542 which claimed priority from Provisional Application No. 60/289,722, filed May 9, 2001, the complete subject matter of which is incorporated herein by reference in its entirety.

BACKGROUND OF THE INVENTION

At least one embodiment of the present invention generally relates to the use of a filter to obtain a correction quantity to correct barometric altimeter readings based on GPS and barometric measurements. At least one embodiment of the present invention generally relates to adjusting the filter between multiple filter gains to account for the rate at which local pressure factors change to correct for errors introduced into the barometric altimeter readings. At least one embodiment of the present invention generally relates to barometer correction based on statistical models that predict drift in the barometer output. At least one embodiment relates to a method for calibrating an atmospheric model used to correct barometric altimeter readings.

In general, altitude measurements are made using a barometric altimeter that senses local atmospheric pressure and, based on a standard model of atmospheric pressures above MSL, converts each pressure measurement to an altitude. Local atmospheric pressure at any given altitude varies widely due to whether, solar heating and the like. In order to afford accurate altitude measurements, barometric altimeter's are calibrated frequently to correct for atmospheric pressure variations.

An alternative technique for determining altitude is based on measurements from receivers within the Global Positioning System (GPS). The GPS system is a network of satellites used to calculate the location of the GPS receivers. The GPS satellites are distributed among six orbits inclined from the equator with consecutive satellite orbits being separated across the equator. The satellites in each orbit have approximately 12-hour orbits and are spaced in order that a number of satellites are visible to a user at any time.

A range measurement is obtained by a GPS receiver from each satellite as well as the location of the satellite at the time of the measurement. Each range measurement is obtained by measuring propagation time of a signal from the satellite to the GPS receiver. Generally, at least four GPS satellite ranges are used to solve for the GPS receiver location, including the (x,y,z) location coordinates of the GPS receiver and the clock bias of an oscillator in the GPS receiver relative to the GPS system time.

The altitude represents the height of a user above sea level, where mean sea level (MSL) altitude is found by converting the x,y,z coordinate position into a height above a reference ellipsoid defined by the WGS-84 (World Geodetic Survey) Model. The MSL altitude is the difference between the MSL height and the local height of the reference ellipsoid.

In the past, the vertical measurements performed by a GPS system have been found to be less accurate than desired with respect to altitude or horizontal measurements. The inaccuracies attributed to altitude measurements in the GPS system are due in part to the fact that the GPS satellites are constrained to be above the horizon in order for signal reception to occur. In this geometry, with all of the visible satellites above the horizon, it is more difficult to measure the vertical or altitude component of a users location since no satellites are visible below the user. The GPS receivers, when measuring physical coordinates, take into consideration satellite geometry (dilution of precision) and estimates of other satellite related errors (URA).

In practice, a barometric altimeter typically provides a more stable measurement of altitude than a GPS system over short periods of time. However, over longer periods of time, pressure variations may be of such magnitude that the barometric altimeter measurement becomes less accurate than GPS derived altimeter measurements. The altitude derived from an uncalibrated barometric altimeter is typically in error by several tens of meters due to normal atmospheric pressure fluctuations, weather fronts and other sources. However, the errors attributed to normal atmospheric pressure fluctuations exhibit bias like characteristics that vary slowly with time. Slow variations in such bias errors cause the barometric altimeter to be less accurate for readings spanning a longer period of time. Accordingly, while an altitude determination derived from barometric pressure may be meaningfully accurate over a short time frame following calibration, over a longer time frame after calibration, the accuracy of such a barometer derived altitude becomes less certain. Conversely, because GPS derived altitudes suffer from different complementary errors, over short periods of time, GPS altitude measurements are subject to large fluctuation and thus more error than barometric altimeter measurements.

U.S. Pat. No. 6,054,477 (McBurney et al.) discloses a method for combining a GPS unit and a barometric pressure sensor, in which an altitude sensor is used to augment availability of GPS location fixes. McBurney et al. provides GPS-assisted determination of location coordinates of a mobile user or selected position on or adjacent to the earth's surface. Elevation readings from an altimeter or barometer are integrated with readings of the GPS-determined elevation for a location, using Kalman filter techniques, minimum least square techniques, or using comparison of statistically defined parameters associated with the altimeter and GPS variables. The resulting elevation coordinate may be a statistical or filter blend of the altimeter value and a GPS-determined value for the elevation coordinate.

The McBurney et al. method however, fails to recognize that utilizing the difference between the GPS derived altitude and a barometric altimeter altitude as a term in calibrating the barometric altimeter, will common mode out any dynamic changes due to movement of both the barometric altimeter and GPS receiver at the same time. As a result, the McBurney et al. approach requires that the user not change altitude during calibration periods. Hence, during the calibration operation, a user of the McBurney et al. method must remain at a single altitude, preferably stationary. In fact, McBurney et al. describes a navigation mode that is separate and discrete from a calibration mode.

The functional separation of the calibration mode and the navigation mode is a common limitation of conventional systems. Heretofore, a barometric altimeter was calibratable using GPS derived altitude information only when the user was stationary, referred to as a "calibration mode". It is only after completing the "calibration mode" that the conventional systems enter the "navigation mode." Another deficiency of conventional systems is the lack of a method to statistically determined when and whether calibration is needed. Instead, conventional systems perform calibration at startup and when the user manually directs the device to perform a calibration operation.

A need remains for an improved navigation device capable of calibration throughout operation without separating navigation and calibration functions. Embodiments of the present invention meet this need and other problems experienced theretofore that will become apparent from the above and following description.

SUMMARY OF THE INVENTION

In accordance with at least one embodiment of the present convention, a navigation device is provided having a barometric altimeter for obtaining barometric elevation readings based on barometric pressure measurements. A processor is provided for obtaining GPS elevation readings based on GPS measurements. The processor calculates differences between the barometric elevation readings and the GPS elevation readings. A filter is also provided for filtering the differences to produce a barometric altitude correction quantity, where the filter gain is adjustable to correct for error caused by changing factors that vary differently over short and long periods of time. The processor corrects the barometric elevation readings based on the barometric altitude correction quantity generated by the filter.

In accordance with one alternative embodiment, a statistical model may be provided modeling barometric altimeter drift as a function of time with the filter adjusting the filter characteristics based the anticipated drift in the barometric reading. The filter may perform the filtering operations based upon one of multiple filter gain parameters. When initially turned on, the filter gain parameter may be chosen based on an elapsed time since the barometric altimeter was last calibrated. Alternatively, the filter may use a first set of filter gain parameters to remove, from the baro-GPS difference, effects due to short-term fluctuation and a second set of filter gain parameters to remove, from the baro-GPS difference, effects due to long-term fluctuations in conditions.

In at least one embodiment, the processor and filter calibrate the barometric altimeter while the navigation device is in motion and while the elevation changes. The processor and filter may continuously calculate the barometric altimeter correction quantity throughout operation while in a navigation mode.

Optionally, the barometric altimeter may calculate barometric elevation readings based on an atmosphere model correlating barometric pressure readings to particular elevations. The processor may update the atmospheric model continuously throughout operation based on the barometric altimeter correction quantity. Alternatively, the processor may adjust the atmospheric model at least once during operation by recalculating the elevation associated with a particular barometric pressure measurement based on the difference between the barometric and GPS elevation readings associated therewith.

In accordance with at least one embodiment, a method is provided for calculating altitude based on measurements from a barometric sensor and measurements from the GPS receiver. The method includes obtaining a first elevation based on barometric pressure measurements and a second elevation based on GPS coordinate information. The difference is calculated between the first and second elevations. A state feedback loop is utilized to drive the difference between the first and second elevations to a value of zero. A corrected altitude is calculated based on an output of the state feedback loop and the first elevation.

Optionally, the method may include computing at least two gain values defining a rate at which the state feedback loop converges to zero. The method may further include using one of the at least two gain values in the feedback loop. Optionally, a gain value may be selected from a set of multiple gain values, where the selected gain value controls a rate at which the state feedback loop converges to zero. Optionally, the state feedback loop may continuously update the altitude based on the first elevation and the output of the state feedback loop. Alternatively, the state feedback loop may update, at discrete intervals, not continuously, the altitude based on the first elevation and the output of the state feedback loop.

BRIEF DESCRIPTION OF THE DRAWINGS

The foregoing summary, as well as the following detailed description of the preferred embodiments of the invention, will be better understood when read in conjunction with the appended drawings. For the purpose of illustrating the present invention, there is shown in the drawings, embodiments that are presently preferred. It should be understood, however, that the present invention is not limited to the precise arrangements and instrumentality shown in the attached drawings.

DETAILED DESCRIPTION OF THE INVENTION

Figure 1:
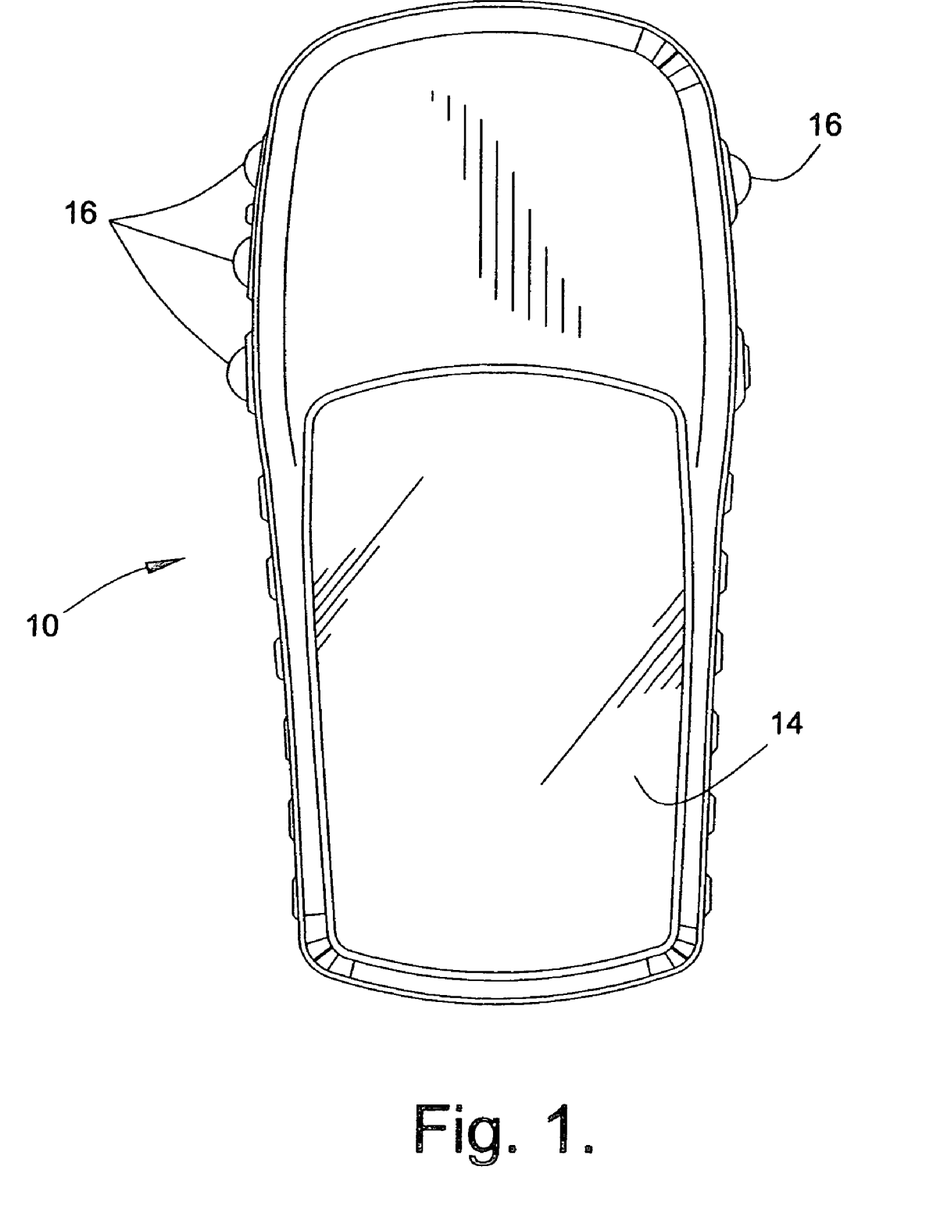
FIG. 1 illustrates a navigation device formed in accordance with at least one embodiment of the present invention.

FIG. 1 illustrates a navigation device 10 that incorporates an embodiment of the present invention. Navigation device 10 includes a housing 12, a display 14, and an input 16, such as preferably a keypad input. Optionally, the input 16 may use a touchscreen. The housing 12 is preferably sized to be a portable unit, although the invention is not limited to portable units.

Figure 2:
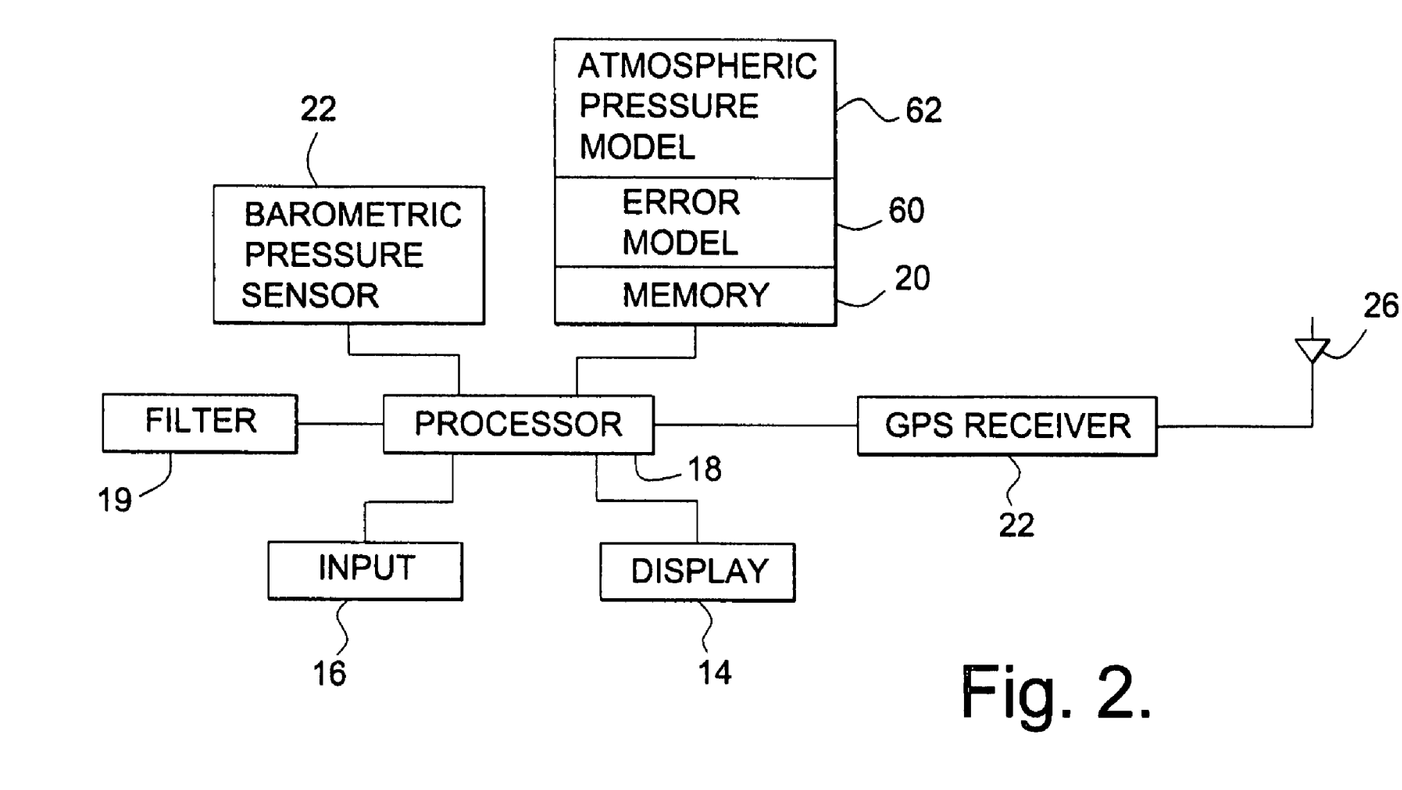
FIG. 2 illustrates a block diagram of the internal components of a navigation device formed in accordance with an embodiment of the present invention.

FIG. 2 illustrates the navigation device 10 in a block format. The navigation device 10 includes a processor 18 that is connected to memory 20, display 14, input 16 and a barometric pressure sensor 22. Additionally, a GPS receiver 24 is connected to the processor 18 to provide GPS data to the processor 18. A filter 19 may be part of or separate from the processor 18. The filter 19 filters a difference between the GPS and barometer derived altitudes. An antenna 26 is connected to the GPS receiver 24 to receive GPS signals. A power source, such as a battery, battery pack, AC/DC adapter and the like are provided to supply power to the various electronic components. Additionally, navigation device 10 may include a port, such as a serial dataport, for connecting the device 10 to a remote processor or personal computer for uploading information (such as mapped information) to the device 10, or for downloading information (such as route information) to a remote processor or personal computer. Alternatively, the device 10 may include wireless communication capabilities such that data is received wirelessly from a remote site. As to be understood and appreciated, various electronic components are housed within the housing 12, such that display 14 and keypad input 16 are accessible and exterior of the housing.

The barometric pressure sensor 22 obtains barometric pressure readings periodically, such as every second and the like.

The altimeter sensor outputs local ambient pressure based on remaining atmosphere above the sensor. For example, at sea level, the average pressure is 29.92 inches of mercury (1013.25 millibars). At an elevation of 1000 feet, the average pressure is 977 millibars. A standard model as maintained by the ICAO, a standards organization, of the atmosphere equates certain altitudes with fixed pressures. The model models a column of atmosphere. The atmospheric model is based on certain assumptions about the atmosphere. For example, the standard atmospheric model assumes that the atmosphere is entirely calm with no wind.

The GPS receiver 24 and antenna 26 receive, from multiple satellites, GPS data that is processed by the processor 18 to provide GPS coordinate information periodically, such as every second and the like. The memory 20 stores, among other things, models, including an atmospheric pressure model 62 and a barometer drift error model 60. The barometer drift error model 60 defines a statistical relation between an anticipation drift in a barometric altimeter reading based upon an amount of time since the navigation device 10 was last calibrated. The atmospheric pressure model 62 is based on a standard atmospheric pressure model (described below in more detail) which is calibrated throughout operation by the processor 18 in order to update the atmospheric pressure model 62 from a standard model for a particular user's environment.

Figure 3:
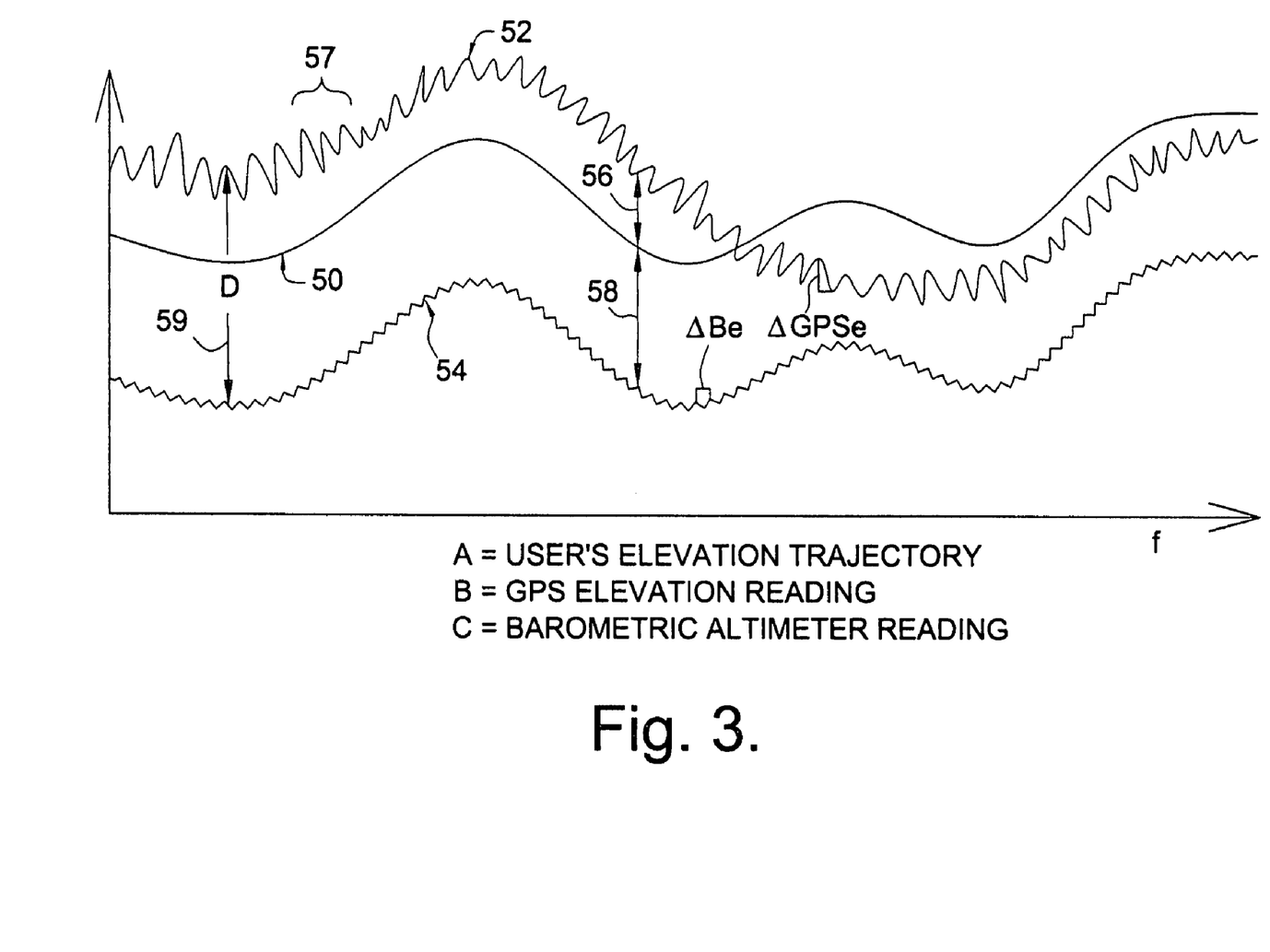
FIG. 3 illustrates a graphical representation over time of a user elevation trajectory, and associated GPS elevation readings and barometric altimeter readings.

FIG. 3 illustrates a graph having a horizontal axis representing time and a vertical axis representing altitude. The graph illustrates a user's actual elevation trajectory 50, GPS elevation readings 52, and barometric altimeter readings 54 over a period of time. By way of example only, an exemplary elevation profile of a user using navigation device 10 is represented by the elevation trajectory 50 as the user travels over terrain. The GPS elevation readings 52 vary over time as the user moves. As shown in FIG. 3, the GPS elevation reading 52 fluctuates over short periods of time 57. At any instant in time, the GPS elevation error 56 differs slight from the actual elevation trajectory 50. As also shown in FIG. 3, the barometric altimeter reading 54 differs from the elevation trajectory 50 by a barometric elevation error 58. The barometric elevation error 58 changes, over short periods of time, by an amount $\Delta B_{error}$ less than the amount $\Delta GPS_{error}$ of change over the same short period time by the GPS elevation error 56. Hence, over short periods of time, the change $\Delta B_{error}$ barometric altimeter reading 54 varies from the actual elevation trajectory 50 by an amount far less significant than the variation $\Delta GPS_{error}$ in the GPS elevation reading 52.

Before describing the operation of any particular embodiments, a general overview is provided to illustrate, inter alia, that altitude may be calibrated and corrected in accordance with certain embodiments while the device 10 is in motion and while the device 10 continues to provide navigation information. The barometric altitude reading $H_B(t)$ at time t may be modeled by equation (1).

$$H_B(t)=H_T(t)+B_B(t)+Q_B(t) \quad (1)$$

The term $H_B(t)$ is the barometric altitude reading 54 derived from a pressure reading obtained at time t, the term $H_T(t)$ is the true altitude at time (t) along the user elevation trajectory 50 in MSL, the term $B_B(t)$ is a slowly varying bias in the barometer reading (baro-bias term), and the term $Q_B(t)$ is a zero mean Gaussian noise term of variance $\sigma_Q^2$. Equation (1) shows that barometric altitude reading $H_B(t)$ is the sum of the true altitude, plus a baro-bias term $B_B(t)$ that is due to the pressure variation of local pressure from the standard atmospheric model, and a noise term that is due to noise of the sensor, A/D, quantization, and other sources. In order to calibrate the barometric altimeter reading, the baro-bias term $B_B(t)$ must be determined. The baro-bias term $B_B(t)$ constitutes the majority of the error found in the barometer elevation error 58.

The GPS altitude reading $H_G(t)$ obtained at time (t) may be modeled by equation (2).

$$H_G(t)=H_T(t)+B_G(t)+C_G(t) \quad (2)$$

The term $H_G(t)$ is the GPS altitude reading 52 (in MSL), the term $B_G(t)$ is a slowly varying GPS-bias term due to ionospheric errors, ephemeris errors, satellite clock errors, and other factors, and the term $C_G(t)$ is a zero mean correlated noise term. The zero mean correlated GPS noise $C_G(t)$ has a much shorter time constant than either the GPS-bias term $B_G(t)$ or the baro-bias term $B_B(t)$. The variance of the GPS noise $C_G(t)$ is $\sigma_{v,GPS}^2$ and is an estimate of the errors associated with the GPS altitude reading 52. When Selective Availability (correlated error introduced into the satellite signals by the Government Agency controlling the satellites) is in operation, GPS noise $C_G(t)$ constitutes the largest contributor to GPS altitude error. The GPS-bias $B_G(t)$ term is typically much smaller in magnitude than the baro-bias $B_B(t)$ term.

When determining an amount of error in a single sample of the barometric altitude, the processor 18 corrects a discrete barometer altitude reading based, in part, on a corresponding discrete GPS altitude reading. In particular, the processor 18 corrects the barometer altitude reading based on a difference between the barometer altitude reading, hereafter referred to as the baro-GPS difference $\Delta H(t)$. For example, the processor 18 may calculate the baro-GPS difference $\Delta H(t)$ by combining equations (1) and (2) at a particular point in time. The baro-GPS difference $\Delta H(t)$ is set forth in equation (3).

$$H_B(t)-H_G(t)=\Delta H(t)=B_B(t)+Q_B(t)-B_G(t)-C_G(t) \quad (3)$$

Taking the expected or filtered value $E\{\ \}$ of the baro-GPS difference $\Delta H(t)$ yields equation (4).

$$E\{\Delta H(t)\}=B_B(t)-B_G(t) \quad (4)$$

As shown in equation (4), the expected value $E\{\ \}$ of the baro-GPS difference $\Delta H(t)$ can be rewritten without the baro noise $Q_B(t)$ and GPS noise $C_G(t)$. The expected or filtered values $E\{\ \}$ of the noise terms $Q_B(t)$ and $C_G(t)$ are zero since both terms $Q_B(t)$ and $C_G(t)$ are zero mean noise processes. The baro-GPS difference $\Delta H(t)$ is a correction factor that may be used to calibrate the barometric altimeter reading.

Because $Q_B(t)$ and $C_G(t)$ are zero mean random processes, the error involved in estimating the baro-bias term $B_B(t)$ can be reduced by averaging the baro-GPS difference $\Delta H(t)$ over many pressure and GPS samples. The GPS bias component $B_G(t)$ of equation (3) may be ignored since it is typically small relative to the baro-bias component $B_B(t)$. When estimating a random bias in the presence of additive noise, the variance of the estimate is reduced by the number of samples used to form the estimate provided that the additive noise is uncorrelated. The baro noise $Q_B(t)$ is indeed uncorrelated Gaussian noise. However, the GPS noise $C_G(t)$ is correlated noise with a correlation time of $\tau_C$. By way of example only, the GPS noise $C_G(t)$ may be correlated to GPS noise $C_G(t-k)$ in prior GPS measurements, such as at time (t-k). Correlations may be due to factors such as satellite geometry, ionospheric error and the like. Therefore, when expected values are obtained (e.g., filtering is carried out) for a time period greater than the correlation time $\pi_C$, the device 10 obtains appreciable reduction in the variance of the estimate of the baro-GPS difference $\Delta_H(t)$ due to GPS noise $C_G(t)$. By way of example only, long term averaging may be accomplished via a filter to obtain expected values. The processor 18 may perform filtering upon a series of samples for the GPS and barometer altitude readings. The filtering is based on one of multiple gain parameters defining different time constants.

In one embodiment, the processor 18 uses a state feedback loop to form a filter that drives the difference between the barometric altitude reading and the GPS altitude reading $\Delta_H(t)$ to zero. The output of the filter (the feedback term) is then, by definition, equal to $-\Delta H(t)$. The quantity $-\Delta H(t)$ represented the amount needed to correct the barometric altimeter reading. The processor 18 may adjust the gains of the filter to average out zero mean noise induced variations in baro-GPS difference $\Delta H(t)$, such as the GPS noise $C_G(t)$ and baro noise $Q_B(t)$. In this manner, the baro-GPS difference $\Delta H(t)$ preserves, and accounts for, the long-term stability and accuracy of the GPS altitude reading and the short-term stability and accuracy of the barometric altitude reading.

The state feedback loop may be constructed where a state vector X is used having first and second state terms $X_1$ and $X_2$. The first state term $X_1$ equals $\Delta H(t_k)$, and thus $X_1$ represents the difference between the barometer and GPS derived altitudes at time $t_k$. The baro-GPS difference $\Delta H(t_k)$ is also considered the vertical error at sample time $t_k$. The second state term $X_2$ equals an integrated vertical error, or, in other words, a total vertical error over a period of time spanning several sample times tk. The state feedback loop may be described through state space equations that are written below in equations (5) and (6).

$$\dot{X} = \begin{bmatrix} 0 & 0 \\ 1 & 0 \end{bmatrix} X + \begin{bmatrix} 1 \\ 0 \end{bmatrix} U + \begin{bmatrix} \Delta H(t_k) \\ 0 \end{bmatrix} \quad (5)$$

$$U = -[C_1 \; C_2] X \quad (6)$$

The vector $\dot{X}$ represents the change in the vector X between times $t_k$ and $t_{k-1}$. The parameters $C_1$ and $C_2$ represent gain parameters used to adjust the time constant of the feedback loop. For example, parameters $C_1$ and $C_2$ may be set to provide a long time constant or may be set to provide a short time constant for the filtering operation of the feedback loop. Combining equations (1) and (2), and ignoring the external driving term in equation (5) provided by baro-GPS difference $\Delta H(t_k)$ yields equation (7).

$$\dot{X} = \begin{bmatrix} -C_1 & -C_2 \\ 1 & 0 \end{bmatrix} X \quad (7)$$

Equation (8) below sets forth the characteristic equation for equation (7).

$$\alpha(s) = s^2 C_1 s - C_2 \quad (8)$$

It may be preferable that the system described in equation (7) have a characteristic equation described by equation (9).

$$\alpha_D(s) = s^2 + 2\omega_0 s + \omega_0^2 \quad (9)$$

Equation (9) has two poles at $[\omega_0, \omega_0]$ where $\omega_0 = 1/\pi$, and r is referred to as the time constant of the solutions. Equating coefficients between equations (8) and (9), enables the gain parameters C1 and C2 to be computed as follows in equations (10a) and (10b).

$$C_1 = -2\omega_0 = -2/\tau \quad (10a)$$

$$C_2 = -\omega_0^2 = -(1/\tau)^2 \quad (10b)$$

When a large value for the time constant $\tau$ is selected by the processor 18, the feedback loop operates as a low pass filter. As a low pass filter, the feedback loop filters out the high frequency components of in the baro-GPS difference $\Delta H(t)$ such as baro noise $Q_B(t)$ and GPS noise $C_G(t)$. In order to filter out the GPS noise $C_G(t)$, it may be desirable for the time constant to exceed the correlation time of the GPS noise $C_G(t)$ $\tau > \tau_C$, where the time $\tau_c$ represents the correlation time constant associated with GPS noise $C_G(t)$. Setting the filter time constant T greater than the GPS noise correlation time constant $\tau_c$ ensures that the components attributed to GPS noise $C_G(t)$ are filtered out. However, when using a large value for the filter time constant $\tau$, the feedback loop drives the system to steady state (convergence) more slowly. Stated another way, the feedback loop moves slowly toward an accurate estimate of the baro-GPS difference $\Delta H(t)$, from which the effects of GPS noise $C_G(t)$ and baro noise $Q_B(t)$ have been removed. Alternatively, when a smaller value is used for the filter time constant $\tau$, the feedback loop converges more quickly to an estimate of the baro-GPS difference $\Delta_H(t)$. However, when a smaller filter time constant is used, the estimated baro-GPS difference $\Delta_H(t)$ is less accurate since the feedback loop performs less filtering of the GPS noise $C_G(t)$ and baro noise $Q_B(t)$.

In one embodiment of the present invention, the processor 18 implements high gain parameters (small filter time constant T) at one point in time and low gain parameters (large filter time constant T) at a later (or earlier) point in time. The processor 18 switches between the high and low gain parameters based on certain conditions as explained below. At steady state (convergence) the change between two consecutive outputs of the feedback loop equals zero, $\dot{X}_1 = 0$, and equation (11) is true.

$$-C_1 X_1 - C_2 X_2 + \Delta H(t_k) = 0 \quad (11)$$

Consequently, the output of the state feedback loop is equal to the negative of the driving term as shown in equation (12).

$$U = -\Delta H(t_k) \quad (12)$$

Note that at steady state, due to the averaging effect of the filter gain parameters $C_1$ and $C_2$, the baro noise $Q_B(t)$ and GPS noise $C_G(t)$ are essentially averaged to near their expected value which is zero. Thus, the output of the state feedback loop equals the barometric altimeter bias term (again, $B_G(t)$ is neglected since it is small), which is shown in equation (13).

$$U = -B_B(t_k) \quad (13)$$

By adding the output of the feedback loop U to equation (1), the processor 18 arrives at a desired barometer altitude reading $H_{B,cal(tk)}$, which is shown in equation (14).

$$H_{B,cal}(t_k) = H_B(t_k) + U(t_k) \quad (14)$$

Note that the correction term may be continuously updated and applied to correct the output of the barometric altimeter, or may be applied at discrete intervals.

The barometric altitude reading 54 may drift significantly between power cycles or times at which the navigation device 10 is turned on. When the device 10 is initially turned on, the processor 18 computes an initial estimate of the baro-GPS difference ΔH(t) quickly in order to minimize the amount of time the barometric altitude reading 54 is in error. In order to arrive at a quick estimate for the baro-GPS difference ΔH(t), the processor 18 initially may use high gain values for parameters C, and $C_2$. However, less of the GPS noise $C_G(t)$ and baro noise $Q_B(t)$ are removed by the filtering effect of the feedback loop when set with high gain parameters.

Once the feedback loop reaches a desired degree of convergence, the processor 18 calibrates the barometric altimeter by adjusting the atmospheric pressure model 62 (as described below) to remove a majority of the barometer drift error, then re-initialize the feedback loop with low gain parameters $C_1$ and $C_2$ to estimate a newer estimate of the baro-GPS difference ΔH(t) which will be much smaller in magnitude. The new estimate of the baro-GPS difference ΔH(t) is then used to calibrate the barometer altimeter reading via equation (14). The two step approach of using two sets of filter gains/time constants and calibrating the atmospheric pressure model 62 yields the greatest accuracy when the unit is subject to very large amounts of elevation change during a power cycle (e.g., between times in which the device 10 is turned on).

Figure 4:
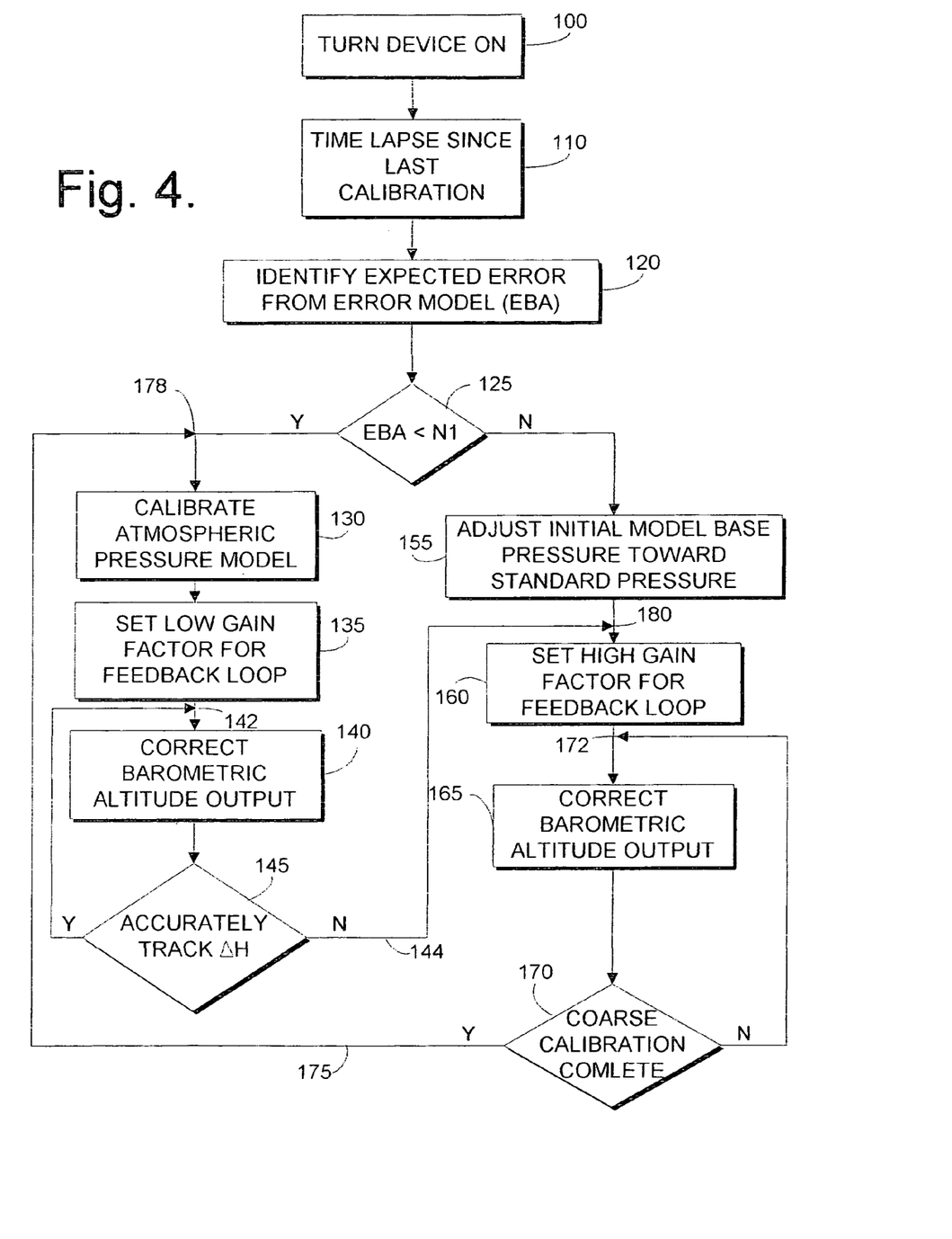
FIG. 4 illustrates a flow chart setting forth a processing sequence carried out in accordance with an embodiment of the present invention.

FIG. 4 illustrates a processing sequence carried out in accordance with at least one embodiment of the present invention to correct barometric altimeter reading 54. At step 100, the device 10 is turned on. At step 110, the processor 18 determines the amount of time that has lapsed since the device 10 was last turned on and/or since the last calibration operation was performed of the barometric altimeter reading 54. At step 120, the processor 18 accesses a drift error model 60 stored in memory 20 in order to determine an expected amount of error in the barometric altimeter reading 54. The barometric altimeter reading 54 is read from the drift error model 60 at step 120. For example, if the processor 18 determines at step 110 that the device 10 has not been calibrated for two hours, the processor 18 accesses the drift error model 60 at step 120 to determine the maximum potential variation in barometer derived altitude over a two-hour period, such as for example ±100 feet. The variation is considered the expected error ($E_{BA}$).

The error model 60 may be generated based on empirical studies performed over an extended period of time, during which the barometric pressure is repeatedly measured at a fixed coordinate location and altitude. The measured barometric pressures may be compared with one another to determine a range over which barometric pressure may vary within discrete periods of time. By way of example only, barometric pressure readings may be measured in Denver every minute, 24 hours a day for a year. The barometric pressure readings may then be statistically compared to determine the range over which the barometric pressure and altitude derived therefrom varies during the prior year over every thirty minute period, one-hour period, one day period, one week period, and the like. Over the course of the year, it may be determined that barometer derived altitude may vary in a thirty minute period ±20 feet. Similarly, it may be determined that the barometer derived altitude may vary in an hour ±40 feet, over a week ±100 feet, and the like. This information is then stored in the drift error model 60.

Alternatively, the drift error model 60 may be derived from weather patterns known for a particular geographic area or multiple geographic locations and altitudes.

Once the expected error $E_{BA}$ is identified at step 120 from the drift error model 60, control passes to step 125, at which the processor 18 determines whether the expected error $E_{BA}$ in the barometer derived altitude is less than a predetermined threshold NI. The threshold NI is used to distinguish whether a coarse calibration operation (steps 155–170) should be performed, followed by a fine calibration operation (steps 130–145) or, alternatively, whether a fine calibration operation alone should be performed. If the expected error $E_{BA}$ is less than the threshold NI, control passes to step 130 after which a fine calibration operation is carried out. If the expected error $E_{BA}$ is greater than the threshold NI, control passes to step 150 after which a coarse calibration is carried out. At step 130, the processor 18 calibrates the atmospheric pressure model 62 stored in memory 20. By way of example, the atmospheric pressure mode 62 may be defined by the following equation (15), at least for altitudes below 11,000 meters.

$$H_B = \frac{T_O}{L}\left[\left(\frac{P_L}{P_B}\right)^{\frac{-RL}{g}} - 1\right] \quad (15)$$

The quantities in equation (15) are defined in the 1993 ICAO Standard Atmosphere Model, where $T_O$ represents the standard temperature at sea level; L represents lapse rate; R represents a gas constant; g represents acceleration of gravity; $P_L$ represents local pressure (measured by the barometer); PB represents base pressure (e.g., at Sea Level); and $H_B$ represents the actual local altitude. From equation (15), it is shown that the atmospheric pressure model 62 that relates pressure to altitude is an exponential model, not a linear model. Thus, if one determines that ΔH is 30 meters at a nominal altitude of 500 meters, it does not hold that the proper calibration factor will still be 30 meters at a nominal altitude of 5000 meters. The reason is that 30 meters of elevation difference at 500 meters nominal altitude is a far greater pressure differential than 30 meters of elevation difference at 5000 meters nominal altitude. The calibration method employed in FIG. 4 accounts for this discrepancy.

To calibrate the atmospheric pressure model 62, the processor 18 holds constant the local pressure $P_L$ as measured by the barometer and, based on equation (15), recalculates the model base pressure PB, to obtain a calibrated model base pressure $P_{B,cal}$. The newly calibrated model base pressure $P_{B,cal}$ as shown in equation (16) below is used in subsequent altitude computations using equation (14) to correct the barometer altitude reading.

The calibrated model base pressure $P_{B,cal}$ is computed as shown below in equation (16) and thereafter, the calibrated barometer altitude $H_{B,cal}$ is computed via equation (15).

$$P_{B,cal} = \frac{P_L}{\left[\frac{H_{B,cal} * L}{T_O} + 1\right]^{\frac{-g}{RL}}} \quad (16)$$

The processor 18 stores the new value for the calibrated model base pressure $P_{B,cal}$ in the atmospheric pressure model 62. Thereafter, control passes to step 135. At step 135, a low gain factor is set for the feedback loop, the output U(t) of which is used to correct the barometric altimeter reading.

The low gain factor may constitute one or more filter parameters, such as $C_1$ and $C_2$, noted above. For instance, parameters $C_1$ and $C_2$ may be set based on a long time constant $\tau > \tau_c$. When the expected error $E_{BA}$ is less than the threshold N1, the anticipated error is small and thus the actual altitude should be close to the barometric altimeter reading 54.

At step 140, the processor 18 corrects the barometric altimeter reading 54 based on the output of the feedback loop (discussed below in connection with FIG. 5). At step 145, the processor 18 determines whether the state feedback loop is accurately tracking the difference between the barometric altimeter reading 54 and GPS elevation reading 52. If accurate tracking is carried out, control loops back to node 142 where the feedback loop again corrects the barometric altitude reading (step 140) while using the low gain factor set at step 135. The loop between steps 140 and 145 is repeated continuously so long as the state feedback loop accurately tracks the baro-GPS difference $\Delta H(t)$. If at step 140, the processor 18 determines that the state feedback loop is not accurately tracking the difference between the barometric altimeter reading 54 and GPS elevation reading 52, control passes along path 144 to node 180 where a coarse calibration operation is initiated.

In order to determine at step 145 whether the feedback loop is accurately tracking the baro-GPS difference $\Delta H(t)$, the processor 18 may perform a comparison based upon the following equation (17).

$$|U(t_k)+\Delta H(t_k)|>\beta^*\sigma(t_k)_{V,GPS} \qquad (17)$$

In equation 17, the value $U(t_k)$ represents the output of the feedback loop at time $(t_k)$, the value $\Delta H(t_k)$ represents the difference between the barometer and GPS derived altitudes, the value $\beta$ represents a non-negative real constant, and the value $\sigma(t_k)_{V,GPS}$ represents the uncertainty in the vertical coordinate derived from the GPS measurements at time $(t_k)$. For example, when the GPS derived altitude indicates an altitude of 1,000 feet, such measurement shall include a range of uncertainty, such as ±10 feet. The vertical GPS uncertainty $\sigma(t_k)_{V,GPS}$ is determined as part of the GPS measurements in accordance with known GPS procedures based on the GPS information. When the feedback loop accurately tracks the baro-GPS difference $\Delta H(t)$, the output of the feedback loop $U(t_k)$ should approximate or be near the baro-GPS difference $\Delta H(t_k)$ at the same time $t_k$. The output of the feedback loop $U(t_k)$ is opposite in sign to the baro-GPS difference $\Delta H(t_k)$, and thus the sum of the feedback loop output $V(t_k)$ and the baro-GPS difference $\Delta H(t_k)$ approaches zero when the feedback loop converges.

In equation (17), the processor 18 identifies the situation in which the feedback loop output does not accurately track the baro-GPS difference $\Delta H(t_k)$, since the sum thereof equals a large number that is greater than the vertical GPS uncertainty $\sigma(t_k)v$, GPS times the constant $\beta$. By way of example, when the sum $U(t_k)+\Delta H(t_k)$ exceeds twice the vertical GPS uncertainty, the processor 18 may determine at step 145 that the baro-GPS difference $\Delta H(t_k)$ is no longer being accurately tracked. Hence, flow passes along path 144 to node 180.

By way of example only, the feedback loop may not accurately track the baro-GPS difference $\Delta H(t_k)$ when the navigation device 10 experiences a significant change in its surrounding atmospheric conditions in a very short period of time. For instance, a strong weather system may move through an area quickly. As a further alternative, the user may travel between two geographic regions having substantially different weather conditions. For example, a low pressure weather condition may exist at the source of travel (e.g., the West coast), while a high pressure weather condition may exist at the destination of travel (e.g., the East coast). These and other such factors may cause the feedback loop to be unable to accurately track the baro-GPS difference $\Delta H(t_k)$ when set with low gain factors. In such conditions, processing passes to node 180 after which high gain factors are reset at step 160 and the barometric altitude reading is corrected at step 165 in a coarse calibration until completed at step 170.

By way of example only, the baro-GPS difference $\Delta H(t)$ may equal 100 feet and the gain factors may be set to a low value to cause a slow rate of convergence, such as afforded by a one-hour time constant. In this example, after the processor 18 processes altitude differences for 1 hour, the output U(t) of the state feedback loop will converge by one exponential state from U(t)=100 to V=36. In another hour, the output of the state feedback loop will converge another exponential state from U=36 to U=12. Alternatively, if a high gain factor, such as a 5 minute time constant, were applied to the state feedback loop, the output U(t) would converge from V=100 to U=36 in the first five minutes and from U=36 to U=12 in the second 5 minutes and from V=36 to U=12 in the second 5 minutes.

One issue to consider when using a high gain factor associated with a fast time constant is that the state feedback loop output will be more sensitive to, and react based on, short term changes in $\Delta H(t)$. If new GPS and barometric altitude readings are obtained every second, then the processor 18 will calculate 60 new altitude differences $\Delta H(t)$, respectively, every minute. Over 5 minutes, the state feedback loop will output 30 or 300 convergence values U depending on the sampling rate. The GPS altitude reading may fluctuate noticeably (e.g., ±10 feet) over 5 minutes, even though the user's terrain remains relatively constant. For instance, a hiker may evenly ascend 10 feet of elevation over 5 minutes such as illustrated in FIG. 3 in time interval 80. However, over the same 5 minute interval, the GPS altitude reading may indicate (albeit inaccurately) that the hiker ascended 20 feet over the first 2 minutes, then descended 25 feet over the next 2 minutes and then again ascended 10 feet over the next minute. A state feedback loop having high gain associated with a short time constant would track this erroneous GPS altitude more closely than one with a long time constant.

In one embodiment, a user may turn on the navigation device 10 and calibrate the same to a known altitude. Immediately after calibration, the biases attributed to the GPS altitude readings and to the barometer altitude readings are near zero. In these instances, the state feedback loop is then implemented to track and continuously correct for changes due to atmospheric pressure variations that would otherwise cause the barometric altimeter reading to drift from the actual altitude. By way of example only, a barometric altimeter may drift from a discrete calibrated value over the course of a day or an evening by as much as 100 feet, 200 feet or more. In contrast, the bias that may be introduced over the same period of time in a GPS altimeter reading is substantially less, such as 10 or 20 feet. In these instances, the state feedback loop may be configured to track weather changes, such as by utilizing a long time constant (e.g., a low gain factor). By utilizing a long time constant, the state feedback loop filters out noise components that would appear otherwise as altitude changes over short periods of time. The long time constant attributed to the state feedback loop may be set based upon weather patterns.

In an alternative example, it may assumed that the navigation device may be turned on after sitting for two days since last calibrated. In this example, it is quite probable that weather conditions have changed the barometric pressure and that the barometric altimeter will be inaccurate. In this instance, it is preferable to recalibrate the barometric sensor. When the device is turned on after having sat for a couple days, the processor 18 may set the gain for the state feedback loop to a low gain value having a short time constant. As the state feedback loop operates with the short time constant, it estimates the bias in the barometer very quickly. In the example in which a five minute time constant is used, the state feedback loop would estimate 67% of the error every five minutes. After the state feedback loop has processed a sufficient amount of data to iterate through several of the short time constants, the processor 18 may recalibrate the barometer sensor. For instance, if a five minute time constant is used, after 10 or 15 minutes, the state feedback loop will have converged near the true barometric bias value which may be then used to recalibrate the barometric sensor.

Thereafter, the processor 18 may be reinitialize the state feedback loop by assigning new gain values associated with a longer time constant, such as one hour. Once converted to the longer time constant, the state feedback loop will then more slowly filter out the remaining barometric bias.

Returning to the decision branch at step 125, when flow passes to step 155, the processor 18 adjusts the model base pressure PB used in the atmospheric pressure model 62 towards a standard pressure. The mode base pressure is adjusted according to equation (18).

$$P_B = P_{B,1} + \sigma_{Baro}/\sigma_{Baro,max}(P_{B,S} - P_{B,1}) \tag{18}$$

The term $\sigma_{Baro}$ represents the barometer uncertainty which equals the expected error $E_{BA}$ read from the drift error model 62, the term $P_{B,1}$ represents the initial base pressure measured by the barometer (saved in nonvolatile memory at last power down), the term $P_{B,S}$ represents the standard atmosphere model base pressure, and the term $\sigma_{Baro,max}$ represents the maximum value of barometric altimeter drift or uncertainty. Equation (18) reflects the fact that as the expected error or barometer uncertainty $\rho_{Baro}$ increases (e.g., the anticipated drift error $E_{BA}$ read from drift error model 62), the initial model that is used to calculate altitude based on barometer pressure should use a base pressure at or near the standard modeled base pressure $P_{B,S}$. At step 160, a high gain factor is set for the feedback loop. The high gain factor may be set by assigning values to filter parameters C1 and C2 based on a short time constant $\tau < \tau_C$. At step 165, the processor 18 corrects the barometric altitude reading 54 through the feedback loop as explained below in connection with FIG. 5. Following correction of each barometric altimeter reading 54 at step 165, the processor 18 performs a test at step 170 to determine whether the feedback loop has converged by a desired amount and thus completed a coarse calibration of the barometric altimeter. If the feedback loop has not yet completed the coarse calibration, flow returns to node 172 and the feedback loop continues to correct the barometric altitude reading 54 (step 165) based on the high gain factors set at step 160. Once the coarse calibration operation is completed at step 170, flow passes along path 175 to node 178. After node 178, the barometer atmospheric pressure model 62 is calibrated again by the processor 18 at step 130 and the low gain factors are set at step 135. Thereafter, flow passes between steps 140 and 145 as explained above.

By way of example only, at step 170, the processor 18 may carry out a determination in accordance with equation (19) set forth below.

$$|U(t_k) + \Delta H(t_k)| < \alpha^* \sigma(t_k)_{V,GPS} \tag{19}$$

Equation (19) substantially follows equation (18) set forth above, however a different constant $\alpha$ is used, where the constant $\alpha$ may be larger than the constant $\beta$ used in equation (18). As explained above in connection with the decision at step 145, the coarse calibration determination at step 170 determines whether the difference between the output of the feedback loop $U(t_k)$ is within some acceptable range of the baro-GPS difference $\Delta H(t_k)$. The acceptable range is set as a multiple a of the vertical GPS uncertainty $\sigma(t_k)v$. GPs at $\tau(t_k)$ which is obtained from the GPS information. When the difference between the feedback loop output and the baro-GPS difference fall within an acceptable range of the vertical GPS uncertainty, flow passes along path 175 to node 178 after which a fine calibration operation is performed.

Adjusting the atmospheric pressure model 62 in accordance with at least one embodiment of the present invention renders the model 62 more accurate over a significant range of elevations. By way of example only, if a user is located at a nominal altitude of 1,000 feet, yet the barometric reading (based on an uncorrected standard atmospheric model) indicates that the altitude is 1100 feet, then the proper calibration factor AH equals 100 feet. However, should the user move to a much higher nominal altitude, such as while in an airplane, ascending a mountain and the like, the calibration factor will not remain at 100 feet. Instead, if the user moves to a nominal altitude of 5,000 feet, a 100 foot calibration factor would no longer accurately associate the barometric altitude reading and the actual altitude. Instead, at 5,000 feet, the difference between the measured and actual altitudes would be substantially greater than 100 feet. Accordingly, the processor 18 modifies the standard atmospheric model additionally based on the present altitude at which a calibration factor is determined.

Figure 5:
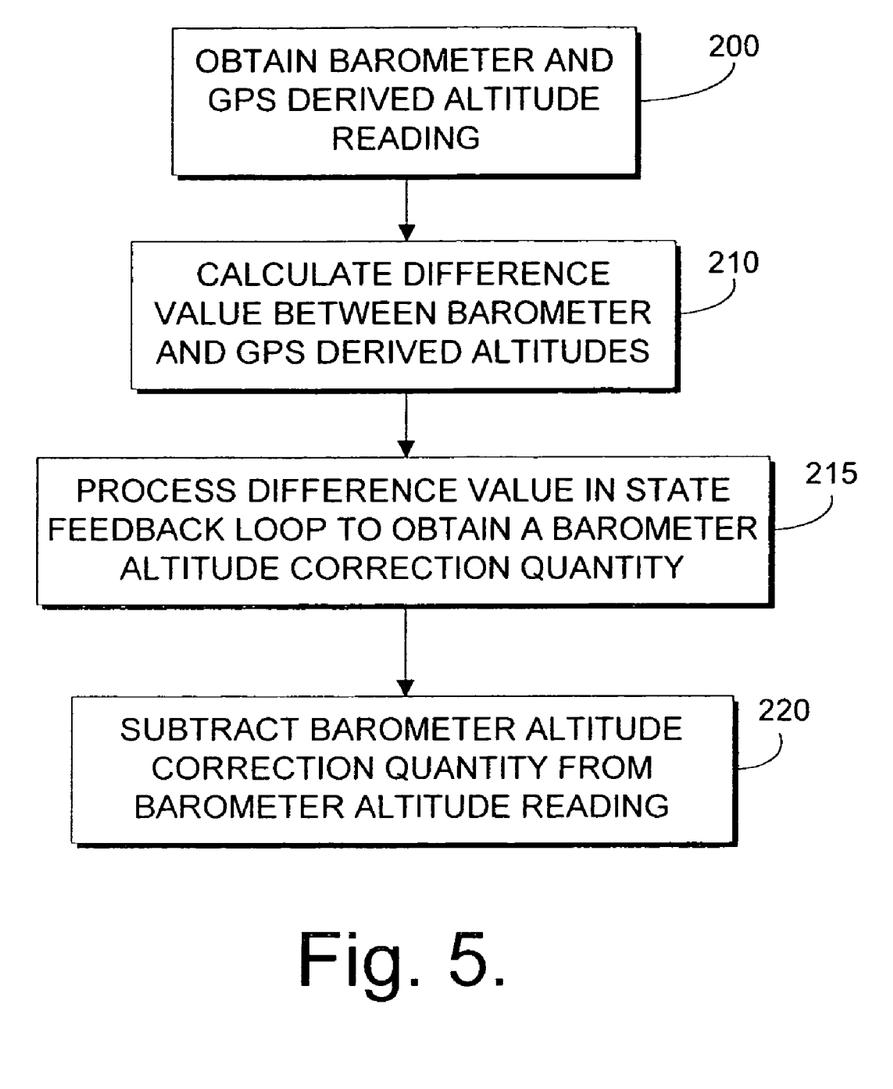
FIG. 5 illustrates a flow chart setting forth a processing sequence carried out in accordance with an embodiment of the present invention.

FIG. 5 illustrates a processing sequence carried out in accordance with one embodiment of the present invention to correct barometric altitude outputs, such as performed at steps 140 and 165 in FIG. 4. In accordance with the method of FIG. 5, the navigation device 10 first obtains barometer and GPS derived altitude readings at step 200. The barometer derived altitude reading may be based on a barometric pressure measured by the barometer sensor 22 that is subsequently applied to the atmospheric pressure model to obtain a corresponding altitude. The GPS derived altitude reading may be obtained from GPS measurement data received by the receiver 24 and antenna 26.

At step 210, the processor calculates the difference value between the barometer and the GPS derived altitudes, namely $\Delta H(t)$. Thus, for example, if the barometer derived altitude is 1,000 feet and the GPS derived altitude is 1,100 feet, the baro-GPS difference $\Delta H(t)$ equals 100 feet. Next, at step 215, the processor 18 applies the baro-GPS difference $\Delta H(t)$ at time (t) to the state feedback loop discussed above in connection with equations (4) and (5). It is noted that, before the state feedback loop is processed, filter parameters $C_1$ and $C_2$ have been assigned values having a desired gain and time constant. For instance, when performing a fine calibration operation, the filter parameters $C_1$ and $C_2$ are assigned low gain factors providing a long time constant to the feedback loop. When the state feedback loop is processed in connection with step 165, the filter parameters $C_1$ and $C_2$ are assigned a high gain factor to provide a short time constant for the feedback loop. After step 215, processing passes to step 220 at which the output of the feedback loop (e.g., the barometer altitude correction quantity) $U(t_k)$ is subtracted from the barometer altitude reading that was derived from the barometer sensor measurement at time tk to obtain a corrected altitude measurement. The corrected barometer altitude reading is displayed as navigation information.

In accordance with at least one embodiment of the present invention, a method is provided able to calibrate a barometric altimeter using the difference between the barometer and GPS derived altitudes while removing any dynamic changes due to movement of the barometer altimeter and the GPS in tandem. In other words, when the user changes altitudes, the altitude change is reflected in both the barometric altimeter reading and the GPS altitude reading, while the difference therebetween continues to accurately reflect any bias experienced in the barometer altitude reading. Accordingly, the device 10 is able to continuously operate in a normal navigation mode while simultaneously performing fine and/or coarse calibration operations. The navigation device 10 described above need not have separate calibration and navigation modes. In fact, the navigation device 10 discussed above is able to perform the coarse and fine calibration operations even while the navigation device is moving and changing altitude.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method for estimating altitude, comprising:
generating a drift error model based on repeated measurements at a fixed coordinate location;
determining a time lapse since a last altitude calibration;
obtaining, from said drift error model, an expected error in altitude readings based on the time lapse since the last altitude calibration;
calculating an estimated altitude based on the expected error; and
comparing drift model measurements with one another to determine a range over which barometric pressure varies within predetermined periods of time.

2. A method for estimating altitude, comprising:
determining a time lapse since a last altitude calibration:
obtaining, from a drift error model, an expected error in altitude readings based on the time lapse since the last altitude calibration;
calculating an estimated altitude based on the expected error; and
storing, in the drift error model, predetermined ranges over which barometric pressure varies within discrete periods of time.

3. A system for estimating altitude, comprising:
an input receiving altitude readings;
a processor determining a time lapse since a last altitude calibration;
memory storing a drift error model containing an expected error in the altitude readings based on the time lapse since the last altitude calibration, said processor calculating an estimated altitude based on the expected error, wherein said drift error model is generated based on repeated measurements at a fixed coordinate location; and
wherein said processor determines a range over which barometric pressure varies within predetermined periods of time, based on comparing drift error model measurements with one another.

4. A system for estimating altitude, comprising:
an input receiving altitude readings;
a processor determining a time lapse since a last altitude calibration;
memory storing a drift error model containing an expected error in the altitude readings based on the time lapse since the last altitude calibration, said processor calculating an estimated altitude based on the expected error; and
wherein said memory stores, in said drift error model, predetermined ranges over which barometric pressure varies during within discrete periods of time.

* * * * *